(12) United States Patent
Aoki et al.

(10) Patent No.: US 10,511,862 B2
(45) Date of Patent: Dec. 17, 2019

(54) VIDEO ENCODING/DECODING DEVICE, METHOD, AND PROGRAM

(71) Applicant: NEC Corporation, Tokyo (JP)

(72) Inventors: Hirofumi Aoki, Tokyo (JP); Keiichi Chono, Tokyo (JP); Masato Tsukada, Tokyo (JP)

(73) Assignee: NEC Corporation, Tokyo (JP)

( * ) Notice: Subject to any disclaimer, the term of this patent is extended or adjusted under 35 U.S.C. 154(b) by 266 days.

(21) Appl. No.: 14/409,220

(22) PCT Filed: May 31, 2013

(86) PCT No.: PCT/JP2013/003458
§ 371 (c)(1),
(2) Date: Dec. 18, 2014

(87) PCT Pub. No.: WO2014/002385
PCT Pub. Date: Jan. 3, 2014

(65) Prior Publication Data
US 2015/0181240 A1    Jun. 25, 2015

(30) Foreign Application Priority Data

Jun. 25, 2012    (JP) .................................. 2012-141924

(51) Int. Cl.
*H04N 19/50* (2014.01)
*H04N 19/70* (2014.01)
(Continued)

(52) U.S. Cl.
CPC ........... *H04N 19/68* (2014.11); *H04N 19/105* (2014.11); *H04N 19/107* (2014.11);
(Continued)

(58) Field of Classification Search
CPC .... H04N 19/68; H04N 19/105; H04N 19/107; H04N 19/196; H04N 19/50
See application file for complete search history.

(56) References Cited

U.S. PATENT DOCUMENTS 5,568,200 A    10/1996  Pearlstein et al.
6,310,897 B1   10/2001  Watanabe et al.
(Continued)

FOREIGN PATENT DOCUMENTS

CN    1200223 A    11/1998
CN    1820494 A    8/2006
(Continued)

OTHER PUBLICATIONS

ISO/IEC 14496-10, "Information technology—Coding of audio-visual objects Part 10: Advanced Video Coding", Dec. 2010.
(Continued)

*Primary Examiner* — Jayanti K Patel
*Assistant Examiner* — Irfan Habib
(74) *Attorney, Agent, or Firm* — Finnegan, Henderson, Farabow, Garrett & Dunner, L.L.P.

(57) ABSTRACT

A video encoder 101 encodes image data of an input moving image based on prediction and generates a video bitstream of encoded pictures. A refresh controller 102 refreshes such that a partial area in the picture is assumed as a unit area to be refreshed and the unit area to be refreshed is moved on a picture-by-picture basis. A display-enabled area encoder 103 encodes a display-enabled area for each picture and generating a display-enabled area information bitstream in refreshing. A multiplexer 104 multiplexes the video bitstream and the display-enabled area information bitstream.

2 Claims, 16 Drawing Sheets

(51) Int. Cl.
*H04N 19/68* (2014.01)
*H04N 19/44* (2014.01)
*H04N 19/105* (2014.01)
*H04N 19/159* (2014.01)
*H04N 19/196* (2014.01)
*H04N 19/107* (2014.01)
*H04N 19/174* (2014.01)
*H04N 19/167* (2014.01)

(52) U.S. Cl.
CPC ......... *H04N 19/159* (2014.11); *H04N 19/167* (2014.11); *H04N 19/174* (2014.11); *H04N 19/196* (2014.11); *H04N 19/44* (2014.11); *H04N 19/50* (2014.11); *H04N 19/70* (2014.11)

(56) References Cited

U.S. PATENT DOCUMENTS

| | | | | |
|---|---|---|---|---|
| 7,898,535 | B2* | 3/2011 | Juenger | G09G 5/36 345/204 |
| 8,184,660 | B2* | 5/2012 | Soroushian | H04N 21/23614 348/390.1 |
| 8,358,373 | B2* | 1/2013 | Yamamoto | G09G 3/3648 348/441 |
| 8,780,986 | B2* | 7/2014 | Wu | H04N 7/5086 375/240.13 |
| 9,078,000 | B2* | 7/2015 | Kazui | H04N 19/176 |
| 9,083,944 | B2* | 7/2015 | Kobayashi | H04N 19/00 |
| 9,374,585 | B2* | 6/2016 | Wang | H04N 19/70 |
| 9,479,773 | B2* | 10/2016 | Wang | H04N 19/70 |
| 9,479,782 | B2* | 10/2016 | Wang | H04N 19/70 |
| 9,699,465 | B2* | 7/2017 | Ouedraogo | H04N 19/159 |
| 9,860,538 | B2* | 1/2018 | Deshpande | H04N 19/70 |
| 9,936,212 | B2* | 4/2018 | Chono | H04N 19/176 |
| 2003/0112867 | A1* | 6/2003 | Hannuksela | H04N 19/174 375/240.08 |
| 2005/0254575 | A1* | 11/2005 | Hannuksela | H04N 19/70 375/240.1 |
| 2008/0292003 | A1* | 11/2008 | Wang | H04N 21/234327 375/240.25 |
| 2009/0003446 | A1* | 1/2009 | Wu | H04N 19/176 375/240.16 |
| 2009/0141888 | A1* | 6/2009 | Kim | H04N 5/76 380/42 |
| 2009/0232199 | A1* | 9/2009 | Kobayashi | H04N 19/00 375/240.01 |
| 2009/0245385 | A1* | 10/2009 | Misuda | H04N 19/176 375/240.24 |
| 2010/0172412 | A1* | 7/2010 | Shimada | H04N 19/51 375/240.12 |
| 2013/0128981 | A1* | 5/2013 | Kazui | H04N 19/50 375/240.16 |
| 2014/0126640 | A1* | 5/2014 | Samuelsson | H04N 19/70 375/240.16 |
| 2015/0103922 | A1* | 4/2015 | Ramasubramonian | H04N 19/80 375/240.26 |
| 2015/0195555 | A1* | 7/2015 | Hendry | H04N 19/46 375/240.16 |
| 2015/0208095 | A1* | 7/2015 | Schierl | H04N 19/70 375/240.28 |
| 2015/0264366 | A1* | 9/2015 | Hendry | H04N 19/30 375/240.01 |

FOREIGN PATENT DOCUMENTS

| | | |
|---|---|---|
| CN | 101094210 A | 12/2007 |
| CN | 102484718 A | 5/2012 |
| EP | 2109318 A2 | 10/2009 |
| JP | 2007-221411 | 8/2007 |
| JP | 2007-318788 | 12/2007 |
| JP | 2011-045138 A | 3/2011 |
| KR | 10-2001-0032272 A | 4/2001 |
| WO | WO 03/071777 A2 | 8/2003 |
| WO | WO 2009/037726 A1 | 3/2009 |
| WO | WO 2012/008054 A1 | 1/2012 |

OTHER PUBLICATIONS

International Search Report and Written Opinion of ISA dated Jul. 30, 2013 in corresponding PCT International Application.
Y. Wang et al., Isolated Regions: Motivation, Problems, and Solutions, Joint Video Team (JVT) of ISO/IEC MPEG & ITU-T VCEG (ISO/IEC JTC1/SC29/WG11 and ITU-T SG16 Q.6), JVT-C072, pp. 1-13, May 2002.
G. Sullivan, "Cropping, Generalized Pan-Scan, and Source Formats", Joint Video Team (JVT) of ISO/IEC MPEG & ITU-T VCEG (ISO/IEC JTC1/SC29/WG11 and ITU-T SG16 Q.6), JVT-C137, pp. 1-5, May 2002.
M. M. Hannuksela et al., "Optional Motion Compensation Limitation for FMO", Joint Video Team (JVT) of ISO/IEC MPEG & ITU-T VCEG (ISO/IEC JTC1/SC29/WG11 and ITU-T SG16 Q.6), JVT-D096, pp. 1-7, Jul. 2002.
Y. Wang et al., "On Random Access", Joint Video Team (JVT) of ISO/IEC MPEG & ITU-T VCEG (ISO/IEC JTC1/SC29/WG11 and ITU-T SG16 Q.6), JVT-D097, pp. 1-13, Jul. 2002.
Y. Wang et al., "Gradual Decoder Refresh Using Isolated Regions", Joint Video Team (JVT) of ISO/IEC MPEG & ITU-T VCEG (ISO/IEC JTC1/SC29/WG11 and ITU-T SG16 Q.6), JVT-C074, pp. 1-19, May 2002.
Extended European Search Report dated Oct. 30, 2015 by the European Patent Office in counterpart European Patent Application No. 13808468.6.
Notification of the First Office Action issued by the Patent Office of the People's Republic of China in counterpart Chinese Patent Application No. 201380033533.3, dated Jan. 25, 2017.
Decision to Grant a Patent issued by the Japanese Patent Office in counterpart Japanese Patent Application No. 2014-522392, dated Jul. 5, 2017.
Aoki et al., "AHG9: SEI messages for gradual decoding refresh", Joint Collaborative Team on Video Coding (JCT-VC) of ITU-T SG 16 WP 3 and ISO/IEC, JTC 1/SC 29WG 11, 10th Meeting,: Stockholm, SE, JCTVC-J0064, pp. 1-15, (2012).
Decision to Grant a Patent dated May 22, 2018, and an English-language Machine transtatation, issued by the Japanese Patent Office in counterpart Japanese Patent Application No. 2017-153421.
Notification of Reasons for Refusal of the counterpart Japanese Patent Application No. 2018-116564 dated Feb. 19, 2019.
Notification of Reasons for Refusal of the counterpart Japanese Patent Application No. 2018-116564 dated May 7, 2019.
Osnat Bar-Nir, "Proposal to Improve Ultra Low Delay Coding with Minimal Decoder Impact", Joint Collaborative Team on Video Coding (JCT-VC) of ITU-T SG 16 WP 3 and ISO/IEC JTC 1/SC 29/WG 11 8th Meeting: San Jose, CA, USA, Feb. 1-10, 2012, [JCTVC-H0471].
Notification of Reasons for Refusal (Korean Office Action) dated Jul. 22, 2019, issued by the Korean Patent Office in counterpart Korean Patent Application No. 10-2019-7013346.
Chinese Office Action dated Aug. 12, 2019, issued by the Chinese Patent Office in counterpart Chinese Patent Application No. 201710985971.X, 6 pages.
Chinese Office Action dated Sep. 10, 2019, issued by the Chinese Patent Office in counterpart Chinese Patent Applicaiton No. 201710983749.6, 11 pages.

* cited by examiner

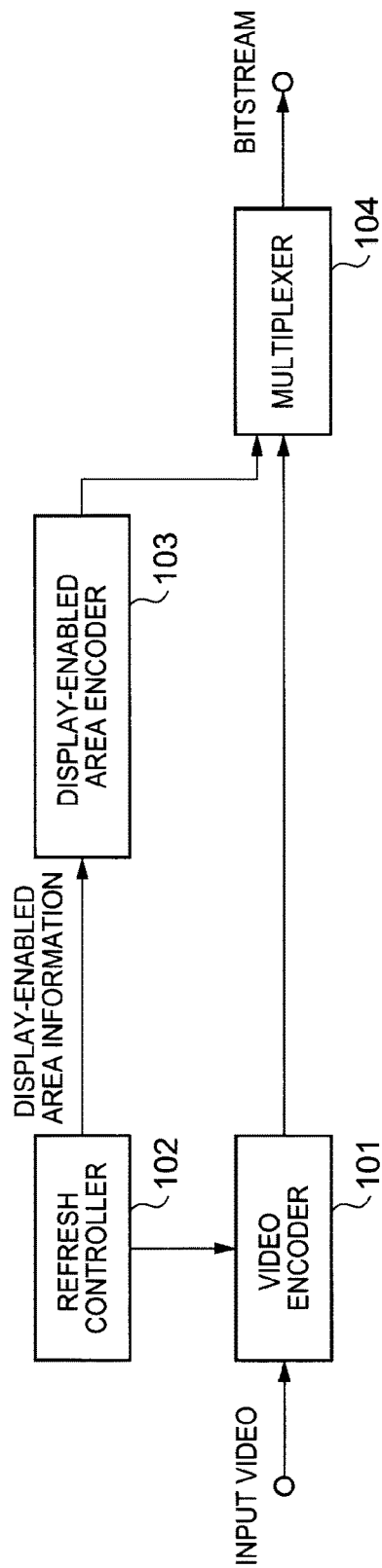

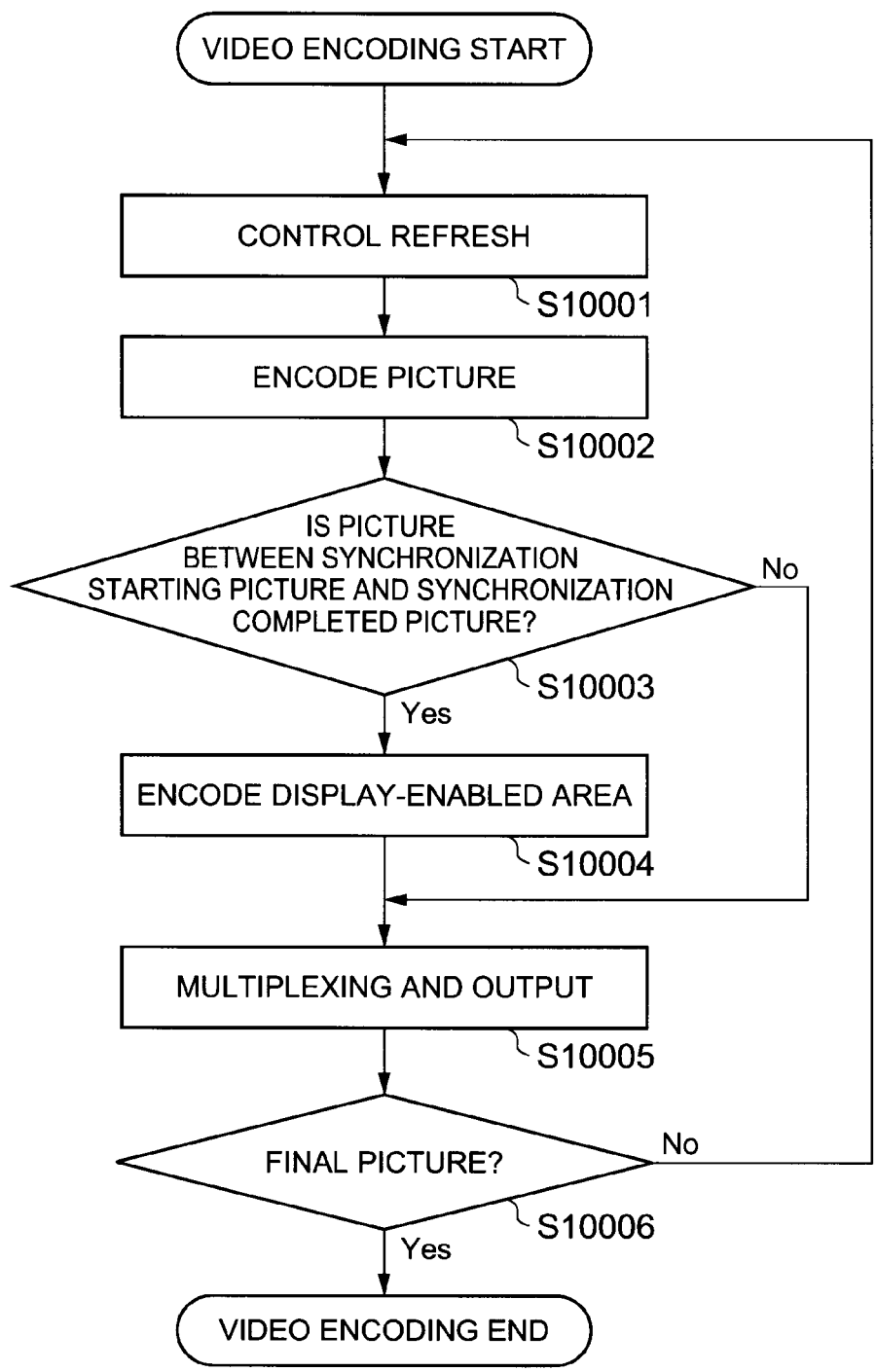

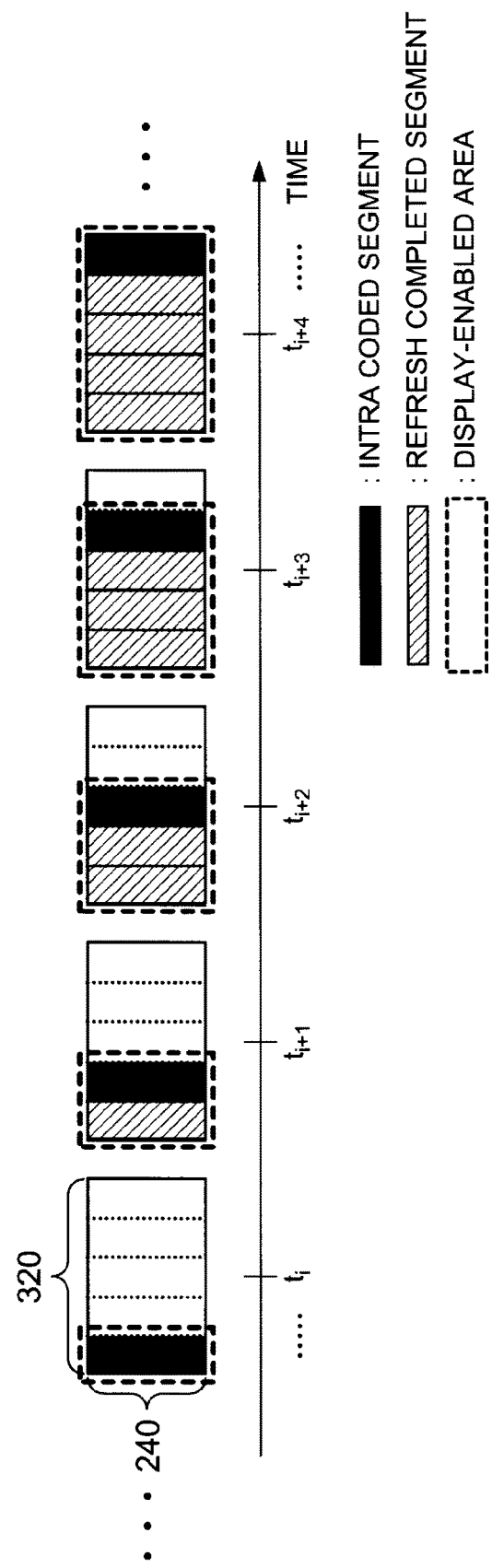

FIG. 4

| partial_recovery( payloadSize ) { | C | Descriptor |
|---|---|---|
| recovery_starting_poc_cnt | 5 | ue(v) |
| partial_recovery_cnt_minus1 | 5 | ue(v) |
| for( i=0; i <= partial_recovery_cnt_minus1; i++ ) { | | |
| exact_match_flag[i] | 5 | u(1) |
| recovery_rect_left_offset[i] | 5 | ue(v) |
| recovery_rect_right_offset[i] | 5 | ue(v) |
| recovery_rect_top_offset[i] | 5 | ue(v) |
| recovery_rect_bottom_offset[i] | 5 | ue(v) |
| } | | |
| } | | |

FIG. 5

| partial_recovery_update( payloadSize ) { | C | Descriptor |
|---|---|---|
| partial_recovery_ref_poc_cnt | 5 | ue(v) |
| for( i=0; i <= partial_recovery_cnt_minus1; i++ ) { | | |
| if( RefRecvRectLeft[i] > 0 ) { | | |
| recovery_rect_left_offset_decr[i] | 5 | ue(v) |
| } | | |
| if( RefRecvRectRight[i] < PicWidthInSamples -1 ) { | | |
| recovery_rect_right_offset_decr[i] | 5 | ue(v) |
| } | | |
| if( RefRecvRectTop[i] > 0 ) { | | |
| recovery_rect_top_offset_decr[i] | 5 | ue(v) |
| } | | |
| if( RefRecvRectBottom[i] < PicHeightInSamples -1 ) { | | |
| recovery_rect_bottom_offset_decr[i] | 5 | ue(v) |
| } | | |
| } | | |
| } | | |

FIG. 6

| recovery_point( payloadSize ) { | C | Descriptor |
|---|---|---|
| recovery_frame__cnt | 5 | ue(v) |
| exact_macth_flag | 5 | u(1) |
| broken_link_flag | 5 | u(1) |
| changing_slice_group_idc | 5 | u(2) |
| partial_recovery_info_present_flag | 5 | u(1) |
| if( partial_recovery_info_present_flag ) { | | |
|    partial_recovery_cnt_minus1 | 5 | ue(v) |
|    for( i=0; i <= partial_recovery_cnt_minus1; i++ ) { | | |
|      exact_macth_flag[i] | 5 | u(1) |
|      recovery_rect_reft_offset[i] | 5 | ue(v) |
|      recovery_rect_right_offset[i] | 5 | ue(v) |
|      recovery_rect_top_offset[i] | 5 | ue(v) |
|      recovery_rect_bottom_offset[i] | 5 | ue(v) |
|    } | | |
| } | | |
| } | | |

FIG. 7

| recovery_point( payloadSize ) { | C | Descriptor |
|---|---|---|
|     recovery_frame__cnt | 5 | ue(v) |
|     exact_macth_flag | 5 | u(1) |
|     broken_link_flag | 5 | u(1) |
|     changing_slice_group_idc | 5 | u(2) |
|     partial_recovery_info_present_flag | 5 | u(1) |
|     if( partial_recovery_info_present_flag ) { | | |
|         partial_recovery_cnt_minus1 | 5 | ue(v) |
|         for( i=0; i <= partial_recovery_cnt_minus1; i++ ) { | | |
|             exact_macth_flag[i] | 5 | u(1) |
|             recovery_rect_reft_offset[i] | 5 | ue(v) |
|             recovery_rect_right_offset[i] | 5 | ue(v) |
|             recovery_rect_top_offset[i] | 5 | ue(v) |
|             recovery_rect_bottom_offset[i] | 5 | ue(v) |
|             partial_recovery_update_info_present_flag[i] | 5 | u(1) |
|             if( partial_recovery_update_info_present_flag[i] ) { | | |
|                 if( recovery_rect_left_offset[i] > 0 ) { | | |
|                     recovery_rect_left_offset_decr[i] | 5 | ue(v) |
|                 } | | |
|                 if( recovery_rect_right_offset[i] > 0 ) { | | |
|                     recovery_rect_right_offset_decr[i] | 5 | ue(v) |
|                 } | | |
|                 if( recovery_rect_top_offset[i] > 0 ) { | | |
|                     recovery_rect_top_offset_decr[i] | 5 | ue(v) |
|                 } | | |
|                 if( recovery_rect_bottom_offset[i] > 0 ) { | | |
|                     recovery_rect_bottom_offset_decr[i] | 5 | ue(v) |
|                 } | | |
|             } | | |
|         } | | |
|     } | | |
| } | | |

FIG. 17

| recovery_point( payloadSize ) { | C | Descriptor |
|---|---|---|
|    recovery_frame__cnt | 5 | ue(v) |
|    exact_macth_flag | 5 | u(1) |
|    broken_link_flag | 5 | u(1) |
|    changing_slice_group_idc | 5 | u(2) |
| } | | |

VIDEO ENCODING/DECODING DEVICE, METHOD, AND PROGRAM

CROSS-REFERENCE TO RELATED PATENT APPLICATIONS

This application is a National Stage Entry of International Application No. PCT/JP2013/003458, filed May 31, 2013, which claims priority from Japanese Patent Application No. 2012-141924, filed Jun. 25, 2012. The entire contents of the above-referenced applications are expressly incorporated herein by reference.

TECHNICAL FIELD

The present invention relates to a video coding technology, in particular, a video coding technology using adaptive predictive coding, which performs compression by adaptively switching intra-picture coding and inter-picture predictive coding.

BACKGROUND ART

A video has a large amount of information, therefore it is necessary to perform compression encoding of the video with high efficiency when the video is recorded and transmitted as digital data. In order to realize high-efficiency compression, various elemental technologies are used for video compression encoding.

There is a predictive coding technology as one of the elemental technologies for video compression encoding. The predictive coding technology is a technology for, when respective pixels in a video are sequentially encoded, generating a predicted value of a pixel to be currently encoded by using one or a plurality of temporally and/or spatially neighboring pixels and encoding a differential signal between an original signal and a predicted signal, instead of directly encoding the original signal. Generally, since each of pixels in a video has a high correlation with temporally and/or spatially neighboring pixels, high-efficiency compression can be performed by using the predictive coding technology.

One of predictive coding technologies is called intra-picture predictive coding which performs prediction by referring a group of pixels included in the same picture, and another technology is called inter-picture predictive coding which performs prediction by referring a group of pixels included in a different picture (referred to as a reference picture). Generally, since there is a certain motion in a video, the inter-picture predictive coding technology is commonly used with a motion compensation technology for increasing prediction efficiency by using spatial displacement information. Note that a "picture" represents a processing unit of a screen, corresponds to a field in a case where a video image of the interlace format is encoded per field unit, while it corresponds to a frame in a case where a video image of the non-interlace format (the progressive format) is encoded and a video image of the interlace format is encoded per frame unit.

Generally, there is a higher correlation in a video, in particular, temporally than spatially. Therefore, the inter-picture predictive coding technology of predictive coding technologies can achieve high-efficiency compression in particular. On the other hand, there is a case when a temporal correlation is reduced remarkably in an entire or partial screen on the basis of movement in a position relationship between a foreground and a background or scene change by editing. Therefore, general video coding formats including ISO/IEC 14496-10 advanced video coding (AVC) described in Non Patent Literature 1 implement an adaptive predictive coding method for encoding partial images as units obtained by subdividing a picture by adaptively switching inter-picture predictive coding and intra-picture predictive coding, or by adaptively switching one of inter-picture predictive coding, intra-picture predictive coding, and intra-picture coding without prediction. A size of unit varies depending on video coding formats, but a rectangular area (referred to as a macroblock) including 16 pixels in a vertical direction and 16 pixels in a horizontal direction is typically used. Hereinafter, the intra-picture coding may be referred to as intra coding.

In the case of using the adaptive predictive coding method, due to a difference in correlation between pictures, a difference in prediction efficiency is caused. Consequently, a difference in compression efficiency is caused. As a result, a situation occurs in which a code amount varies in each picture. In addition, the variation occurs regardless of a transmission band of a transmission path through which a data group (referred to as a bitstream) obtained by compression encoding is transmitted. Therefore, a general video encoding device and a general video decoding device include a buffer memory for storing a bitstream so as to absorb a variation in the code amount and ensure transmission in a predetermined transmission band. The buffer memory is called a coded picture buffer (CPB) in the AVC standard. The capacity of the buffer memory is greatly different depending on characteristics of a system to which an encoding device and a decoding device are applied, but a capacity corresponding to 0.5 second multiplied by a transmission bit rate is typically provided, for example.

In various cases including channel switching of television broadcasts or special replay of storage type contents, it is required to start decoding in the middle of a bitstream, i.e. random access, at the time of recoding and transmitting a video. When decoding is started in the middle of a bitstream generated by the inter-picture predictive coding, a video cannot be normally decoded because of the inter-picture prediction process based on a non-decoded reference picture. Therefore, a general video encoding device implementing the adaptive predictive coding performs encoding control (referred to as refresh) for appropriately inserting intra coding so as to obtain a normal decoded video within a predetermined period of time even when decoding is started in the middle of a bitstream.

One of refresh methods is instantaneous refresh for inserting a picture (referred to as an intra-coded picture) where the whole picture is encoded by intra-picture coding. FIG. 14 illustrates an example of operation of instantaneous refresh. In the drawing, an area indicated by a dashed border is a group of pictures which is a unit of refresh control, and the group is called a refreshing group of pictures (RGOP). In the operation example illustrated in FIG. 14, the video encoding device inserts an intra-coded picture every four pictures, and controls such that three pictures subsequent to the intra-coded picture do not use a picture encoded prior to the immediately preceding intra-coded picture as a reference picture, that is, the inter-picture prediction is performed within the refreshing group of pictures. In this manner, even when starting decoding in the middle of a bitstream, the decoding device can obtain a correct decoded image by starting a decoding process from a leading intra-picture of each refreshing group of pictures. In the AVC described in the above Non Patent Literature 1, an intra-coded picture which limits subsequent pictures such that subsequent pictures do not refer to a picture encoded prior thereto, is called instantaneous decoding refresh (IDR) picture and a special picture identifier is assigned to the IDR picture in a bitstream. A video encoding device compliant with the AVC standard can correctly notify a video decoding device of the correct timing to start decoding for refresh by encoding a leading picture of the refreshing group of pictures as an IDR picture.

However, it is a problem that the instantaneous refresh increases transmission delay. As described above, generally, there is a high correlation in a video, in particular, temporally. Therefore, an intra-coded picture that cannot adopt inter-picture prediction requires a larger code amount than other pictures in order to maintain predetermined image quality. A larger difference in generated code amount between pictures increases required capacity of a buffer memory which is provided for the video encoding device and the video decoding device. The increase of capacity of the buffer memory causes an increase in transmission delay between the encoding device and the decoding device. Therefore, the instantaneous refresh is not appropriate for a use requiring high real-time property, such as equipment remote control through a video.

On the other hand, as a refresh method satisfying demands for a decrease in transmission delay, there is a method (referred to as gradual refresh) for gradually refreshing an screen by the partial area (referred to as segment) which is obtained by dividing the screen, and performing refresh across a plurality of pictures until refresh is completed. One of typical gradual refresh is intra-slice refresh, which is disclosed in, for example, Patent Literature 1. A slice is a set of coding unit blocks in a picture and refers to a segment that is independent of other coding unit blocks in the picture. An intra slice refers to a slice where intra-frame coding is selected for all coding units in the slice, and prediction using pixels in other slices including another slice of the same frame, is not performed. An intra-slice refresh performs such refresh in which a part of a slice in a picture is encoded as an intra slice and controls such that an area encoded as an intra slice in each of consecutive pictures is moved so that any area in the pictures is encoded as an intra slice at least once within predetermined time period.

FIG. 15 illustrates an example of operation of intra-slice refresh. A picture at the time t is indicated by P(t) below. In FIG. 15, $P(t_{i-4})$, $P(t_i)$, and $P(t_{i+4})$ are start frames of gradual refresh and the four pictures are refreshed until refresh is completed. A period (in FIG. 15, corresponding to 4 pictures) from the start of refresh and to the end thereof is called a refreshing period. In FIG. 15, partial areas indicated by black paint show intra slices. During a refreshing period, refresh of an image is performed by setting each of all areas in a screen to an intra slice at least once.

In the intra-slice refresh illustrated in FIG. 15, in order to refresh certainly, limitation is applied to a referable range for prediction also outside the intra slice, in the same way as the instantaneous refresh illustrated in FIG. 15. In FIG. 15, an area indicated by a dashed border constitutes a group of partial areas, which is a unit for refresh control, and is referred to as a refreshing group of segments (RGOS). Like the refreshing group of pictures in the instantaneous refresh, each refreshing group of segments is limited not to refer to a different refreshing group of segments which starts from a picture prior to a first picture having an area belonging to the refreshing group of segments. A video decoding device which receives and decodes a bitstream encoded as described above can obtain a correct decoded image of pictures after the end position of the refreshing period without disturbance in a whole screen by starting decoding from a leading picture within a refreshing period. Hereinafter, a leading picture within a refreshing period is referred to as a synchronization starting picture. A first picture, from which a correct decoded image can be obtained without disturbance in a whole screen when encoding is performed from the synchronization starting picture, is referred to as a synchronization completed picture.

Incidentally, the gradual refresh does not necessarily need to use an intra slice and is generally realized by limiting a prediction reference relationship between refreshing groups of segments. FIG. 16 illustrates an example of a general gradual refresh. In order to refresh certainly, areas belonging to each refreshing group of segments indicated by a dashed border are limited not to refer to a different refreshing group of segments starting from a picture prior to a leading picture of the refreshing group of segments. Further, more generally, when it is ensured that a decoded image after completion of refresh is sufficiently similar to an image decoded from the beginning of a bitstream, an area belonging to each refreshing group of segments may refer to another refreshing group of segments starting from a frame prior to a leading frame of the refreshing group of segments.

In gradual refresh, an increase in a code amount due to refresh is distributed to a whole refreshing period. That is, unlike an intra-coded picture of the instantaneous refresh, there is no picture which causes an increase in a code amount in the whole screen. Therefore, a variation in a code amount between pictures is more reduced than that in the case of using the instantaneous refresh. As a result, the required capacity of the buffer memory decreases and, furthermore, transmission delay between the encoding device and the decoding device is reduced.

On the other hand, in the case of using the gradual refresh, there is no an explicit refresh start point unlike an IDR picture. Therefore, a video encoding device, which generates a bitstream by using gradual refresh, multiplexes information on a synchronization starting picture and a synchronization completed picture (refresh information) on a bitstream and transfers the bitstream to a decoding device so that a decoding device can start decoding from the synchronization starting picture and also restart image display from the synchronization completed picture.

In the AVC described in Non Patent Literature 1, as a means where an encoding device transfers refresh information to a decoding device, a data group called a recovery point supplemental enhancement information message (recovery point SEI message) is defined. An AVC-compliant encoding device transfers the recovery point SEI message to the decoding device by multiplexing the message on the bitstream. An AVC-compliant decoding device can start decoding from the synchronization starting picture and restart image display from the synchronization completed picture according to the recovery point SEI message. The recovery point SEI message includes information on the synchronization starting picture and the synchronization completed picture and corresponds with both of the instantaneous refresh and the gradual refresh.

A list on FIG. 17 shows syntax elements configuring the recovery point SEI message which is used to transfer refresh information from an AVC-compliant encoding device to an AVC-compliant decoding device.

recovery_frame_cnt is a parameter for notifying of a synchronization completed picture. That is, for example, $P(t_{i-4})$, $P(t_i)$, and $P(t_{i+4})$ illustrated in FIG. 14, and, for example, $P(t_{i-1})$, $P(t_{i+3})$, and $P(t_{i+7})$ illustrated in FIG. 15 are notified. A video decoding device is notified of the paired synchronization starting picture by existence of the recovery point SEI message itself. That is, an AVC-compliant video decoding device starts decoding from the synchronization starting picture to which the recovery point SEI message is associated and continues decoding until the synchronization completed picture indicated by recovery_frame_cnt, thereby obtaining a decoded image without disturbance in the whole screen. Therefore, the video decoding device can select and display only images without disturbance in regard to a bitstream generated using the gradual refresh.

exact_match_flag is a parameter for notifying of whether a decoded image in the case of starting decoding from the synchronization starting picture is exactly matched with a decoded image in the case of receiving and decoding the bitstream from the beginning thereof, in the synchronization completed picture indicated by recovery_frame_cnt.

broken_link_flag is a parameter for notifying of whether there is a possibility that disturbance will occur to the visibly unacceptable extent in a group of pictures existing until the synchronization completed picture indicated by recovery_frame_cnt, when decoding is started from the synchronization starting picture.

changing_slice_group_idc is a parameter for notifying of whether there is a partial area that does not affect completion of refresh even if a decoding process is omitted, in a group of pictures existing until the synchronization completed picture indicated by recovery_frame_cnt, when decoding is started from the synchronization starting picture.

The description related to an example of multiplexing of conventional refresh information with reference to the list of FIG. 17 is ended.

CITATION LIST

Patent Literature

PLT 1: JP 2007-221411 A (paragraph 0005 and 0006)

Non Patent Literature

NPL 1: ISO/IEC 14496-10 Information technology—coding of audio-visual objects Part 10: Advanced Video Coding, Dec. 15, 2010

SUMMARY OF INVENTION

Technical Problem

When gradual refresh is used, refresh of a screen is partially completed in pictures between a synchronization starting picture and a synchronization completed picture. When important information that needs to be instantaneously notified to a viewer exists in partial areas where refresh is completed, it is preferred to start partially displaying areas where refresh is completed, instead of waiting for the synchronization completed picture. However, there is no means for allowing a video decoding device to easily know portions in a screen where refresh is completed, when such a method is used that the synchronization starting picture and the synchronization completed picture are notified of by the recovery point SEI message. Therefore, there is a problem that the video decoding device cannot perform display until the synchronization completed picture, that is, delay of display occurs.

On the other hand, when a reference area restriction for each refreshing group of segments is strictly kept, the video decoding device may know a range which is referred to in a prediction process for each of partial images which are prediction units, during decoding. Therefore, the video decoding device can obtain refreshed partial areas by calculation. However, in case the video decoding device obtains refreshed partial areas through calculation using prediction reference range information, this causes a problem that a computation amount of the video decoding device increases.

When the reference area restriction for each refreshing group of segments is not strictly kept, that is, when exact_match_flag of the recovery point SEI message is set to 0, a decoder cannot know refreshed partial areas even through calculation using the prediction reference range information. Therefore, in order for the decoder to know refreshed partial areas through calculation using the prediction reference range information, a prediction reference range needs to be limited in the video encoding device. That is, in case the video decoding device obtains refreshed partial areas through calculation using the prediction reference range information, such problem occurs that video compression efficiency is reduced, thereby relatively reducing video quality in a system in which exact matching of a decoded image is not necessarily required.

The present invention has been thus made in view of such problems, and its object is to provide a video encoding device, a video encoding method, and a program, capable of notifying a decoding device of a partial area in a screen which can start being displayed until a synchronization completed picture without increasing a computation amount of a decoding device in gradual refresh.

Another object of the present invention is to provide a video encoding device, a video encoding method, and a program, capable of notifying a decoding device of a partial area in a screen which can start being displayed until a synchronization completed picture without reducing video quality in gradual refresh.

Another object of the present invention is to provide a video decoding device, a video decoding method, and a program, capable of, when a bitstream generated by using gradual refresh is decoded and a video is replayed, starting displaying partially until a synchronization completed picture without increasing a computation amount.

Another object of the present invention is to provide a video decoding device, a video decoding method, and a program, capable of, when a bitstream generated by using gradual refresh is decoded and a video is replayed, starting displaying a high-quality video partially until a synchronization completed picture.

Solution to Problem

A video encoding device according to the present invention includes: video encoding means for encoding image data of an input moving image based on prediction and generating a video bitstream of encoded pictures; refresh control means for refreshing such that a partial area in the picture is assumed as a unit area to be refreshed and the unit area to be refreshed is moved on a picture-by-picture basis; display-enabled area encoding means for encoding a display-enabled area for each picture and generating a display-enabled area information bitstream in refreshing; multiplexing means for multiplexing a video bitstream and the display-enabled area information bitstream.

A video decoding device according to the present invention includes: demultiplexing means for demultiplexing a bitstream including video data and a bitstream including display-enabled area information in an image to be decoded;

video decoding means for decoding the demultiplexed video bitstream based on prediction and generating image data; video output control means for restricting an output area of the image data based on the demultiplexed display-enabled area information; and display-enabled area decoding means for decoding the demultiplexed display-enabled area information bitstream according to a predetermined method and extracting at least a part of the display-enabled area information.

A video encoding method according to the present invention includes: encoding image data of an input moving image based on prediction and generating a video bitstream of encoded pictures; refreshing such that a partial area in the picture is assumed as a unit area to be refreshed and the unit area to be refreshed is moved on a picture-by-picture basis; encoding a display-enabled area for each picture and generating a display-enabled area information bitstream in refreshing; and multiplexing the video bitstream and the display-enabled area information bitstream.

A video decoding method according to the present invention includes: demultiplexing a bitstream including video data and a bitstream including display-enabled area information in an image to be decoded; decoding the demultiplexed video bitstream based on prediction and generating image data; restricting an output area of the image data based on the demultiplexed display-enabled area information; and decoding the demultiplexed display-enabled area information bitstream according to a predetermined method and extracting at least a part of the display-enabled area information.

A video encoding program according to the present invention causes a computer to perform: a video encoding process of encoding image data of an input moving image based on prediction and generating a video bitstream of encoded pictures; a refresh control process of refreshing such that a partial area in the picture is assumed as a unit area to be refreshed and the unit area to be refreshed is moved on a picture-by-picture basis; a display-enabled area encoding process of encoding a display-enabled area for each picture and generating a display-enabled area information bitstream in refreshing; and a multiplexing process of multiplexing a video bitstream and the display-enabled area information bitstream.

A video decoding program according to the present invention causes a computer to perform: a demultiplexing process of demultiplexing a bitstream including video data and a bitstream including display-enabled area information in an image to be decoded; a video decoding process of decoding the demultiplexed video bitstream based on prediction and generating image data; a video output control process of restricting an output area of the image data based on the demultiplexed display-enabled area information; and a display-enabled area decoding process of decoding the demultiplexed display-enabled area information bitstream according to a predetermined method and extracting at least a part of the display-enabled area information.

Advantageous Effects of Invention

According to the present invention, when a video decoding device receives and replays a bitstream generated by a video encoding device in the middle thereof, partial display can be started until a synchronization completed picture, thereby reducing display delay.

BRIEF DESCRIPTION OF DRAWINGS

FIG. 1 It depicts a block diagram illustrating a configuration example of a video encoding device of a first exemplary embodiment according to the present invention.

FIG. 2 It depicts a flowchart illustrating an operation example of the video encoding device of the first exemplary embodiment.

FIG. 3 It depicts an explanatory diagram illustrating an example of video encoding by gradual refresh.

FIG. 4 It depicts an explanatory diagram illustrating an example of multiplexing display-enabled area information.

FIG. 5 It depicts an explanatory diagram illustrating another example of multiplexing display-enabled area information.

FIG. 6 It depicts an explanatory diagram illustrating another example of multiplexing display-enabled area information.

FIG. 7 It depicts an explanatory diagram illustrating another example of multiplexing display-enabled area information.

FIG. 17 It depicts an explanatory diagram illustrating examples of syntax elements constituting recovery point supplemental enhancement information message.

DESCRIPTION OF EMBODIMENTS

Figure 8:
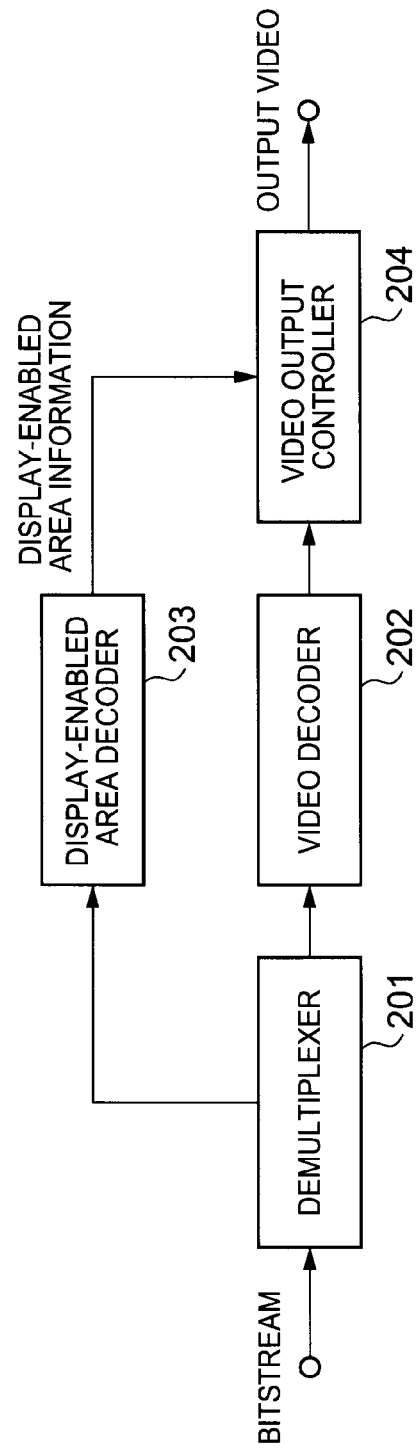
FIG. 8 It depicts a block diagram illustrating a configuration example of a video decoding device of a second exemplary embodiment according to the present invention.

Exemplary embodiments of the present invention will be described below with reference to accompanying drawings.

First Exemplary Embodiment

FIG. 1 is a block diagram of a video encoding device according to a first exemplary embodiment of the present invention. As illustrated in the drawing, the video encoding device of the first exemplary embodiment includes a video encoder 101, a refresh controller 102, a display-enabled area encoder 103, and a multiplexer 104. The present exemplary embodiment is characterized in that the display-enabled area encoder 103 which encodes display-enabled area information of each picture obtained from the refresh controller 102 for supplying to the multiplexer 104.

The video encoder 101 performs encoding on each of pictures in an input video and supplies a bitstream of the video to the multiplexer 104.

When an adaptive predictive coding is performed in the video encoder 101, the refresh controller 102 supplies a control signal to the video encoder 101 such that prediction restriction is kept between refreshing groups of segments so as to perform intended refresh. The refresh controller 102 supplies display-enabled area information of each picture obtained from the refreshing groups of segments to the display-enabled area encoder 103.

The display-enabled area encoder 103 encodes the display-enabled area information supplied from the refresh controller 102 and supplies the encoded display-enabled area information to the multiplexer 104 as a display-enabled area information bitstream.

The multiplexer 104 multiplexes a video bitstream obtained from the video encoder 101 and the display-enabled area information bitstream obtained from the display-enabled area encoder 103 and outputs the multiplexed bitstream as a bitstream.

A video encoding process by the video encoding device of the first exemplary embodiment will be described below with reference to a flowchart of FIG. 2.

In step S10001, the refresh controller 102 supplies control information defining a refresh operation to the video encoder 101 and the display-enabled area encoder 103.

In step S10002, the video encoder 101 encodes respective pictures of an input video and supplies a video bitstream thereof to the multiplexer 104.

In step S10003, when a picture to be currently encoded is a picture between a synchronization starting picture and a synchronization completed picture, the process proceeds to step S10004. When the picture to be currently encoded is not a picture between the synchronization starting picture and the synchronization completed picture, processing of step S10004 is skipped and the process proceeds to step S10005.

In step S10004, the display-enabled area encoder 103 encodes information defining a display-enabled area of each picture and outputs a bitstream thereof to the multiplexer 104.

In step S10005, the multiplexer 104 multiplexes a video bitstream supplied from the video encoder 101 and a display-enabled area information bitstream supplied from the display-enabled area encoder 103 and outputs a bitstream.

In step S10006, when the bitstream output in step S10005 corresponds to a final picture to be encoded, video encoding is completed. In a case where the bitstream does not correspond to the final picture, the process returns to S10001.

According to the above configuration, in a case in which the video encoding device generates a bitstream by using gradual refresh, the video encoding device can generate a bitstream so that a video decoding device can start partial display until the synchronization completed picture and reduce display delay, when the video decoding device receives and replays the bitstream in the middle of the bitstream. This is because the video decoding device can know an area that can be displayed partially in pictures until the synchronization completed picture since the multiplexer 104 receives control information defining a display-enabled start area in each picture from the display-enabled area encoder 103, multiplexes the control information on a bitstream, and transmits the control information to the video decoding device.

EXAMPLE

A specific example of the video encoding device of the above first exemplary embodiment will be described below.

In the present example, with respect to a progressive video in which a spatial resolution for each frame is 320× 240 pixels, the most left area of 64×240-pixel areas obtained by uniformly dividing a picture by 5 in a horizontal direction is set as an intra-coded segment, and refresh is performed so that an intra-coded segment is shifted so as not to be overlapped with each other through 5 pictures.

FIG. 3 illustrates a specific case where refresh is performed. In FIG. 3, a picture P ($t_i$) at time $t_i$ is assumed as a synchronization starting picture, and P($t_{i+4}$) is assumed as a synchronization completed picture. A refresh completion segment in the picture P(t) at time t indicates an area set as an intra-coded segment one time from time $t_i$ to time t. In this case, respective display-enabled areas of pictures P ($t_i$), P ($t_{i+1}$), P ($t_{i+2}$), P ($t_{i+3}$) and P ($t_{i+4}$) are 64×240-pixel, 128× 240-pixel, 192×240-pixel, 256×240-pixel, and 320×240-pixel rectangular areas from the left of the pictures, respectively. The display-enabled area encoder 103 encodes the respective display-enabled areas for supplying to the multiplexer 104.

Information of the above-described display-enable areas may be multiplexed on a bitstream as a part (referred to as a partial display-enabled area supplemental enhancement information message) of a supplemental enhancement information message, according to the description of "Specification of syntax functions, categories, and descriptors" of Non Patent Literature 1, for example.

An example of multiplexing of display-enabled area information in a list of FIG. 4 will be described below.

Assuming that a picture number of a picture to which the partial display-enabled area supplemental enhancement information message is associated is CurrPicOrderCnt in a case where decoding is started with a picture, which is assumed as a synchronization starting picture, defined by a picture number RecvStartPicOrderCnt obtained by Formula 1 below, recovery_starting_poc_cnt indicates that a display-enabled area represented in the partial display-enabled area supplemental enhancement information message is applied.

$$\text{RecvStartPicOrderCnt} = \text{CurrPicOrderCnt} - \text{recovery\_starting\_poc\_cnt} \quad \text{(Formula 1)}$$

partial_recovery_cnt_minus1 represents a number of rectangular areas which exist in the partial display-enabled area supplemental enhancement information message. A display-enabled area in a picture to which the partial display-enabled area supplemental enhancement information message is associated is obtained as a union of the display-enabled rectangular areas.

exact_match_flag[i] indicates whether a decoded image in a case where decoding is started from a picture defined by RecvStartPicOrderCnt is exactly matched with a decoded image in a case where a bitstream is received and decoded from the beginning thereof in the display-enabled rectangular area. In a case where a decoded value of exact_match_flag[i] is 1, it is indicated that exact matching of a decoded image is achieved with respect to all pixels in the display-enabled rectangular area. In a case where a decoded value of exact_match_flag[i] is 0, it is indicated that there is a possibility that exact matching of a decoded image will not be achieved with respect to all pixels in the display-enabled rectangular area.

recovery_rect_left_offset[i], recovery_rect_right_offset[i], recovery_rect_top_offset[i], and recovery_rect_bottom_offset[i] are a group of parameters that designate a position on a screen of the display-enabled rectangular area. Assuming that both a horizontal coordinate and a vertical coordinate of an upper left pixel of a decoded image are set to 0, and a horizontal coordinate and a vertical coordinate of a lower right pixel of the decoded image are set to PicWidthInSamples−1 and PicHeightInSamples−1, respectively, when an upper left pixel horizontal coordinate, an upper left pixel vertical coordinate, a lower right pixel horizontal coordinate, and a lower right pixel vertical coordinate of the rectangular area in the picture defined in CurrPicOrderCnt are CurrRecvRectLeft[i], CurrRecvRectRight[i], CurrRecvRectTop[i], and CurrRecvRectBottom[i], values of CurrRecvRectLeft[i], CurrRecvRectRight[i], CurrRecvRectTop[i], and CurrRecvRectBottom[i] are calculated by Formula 2 below.

CurrRecvRectLeft[i]=recovery_rect_left_offset[i]
CurrRecvRectRight[i]=PicWidthInSamples-1-recovery_rect_right_offset[i]CurrRecvRectBottom[i]=recovery_rect_top_offset[i]
CurrRecvRectBottom[i]=PicHeightInSamples-1-recovery_rect_bottom_offset[i]   (Formula 2)

Now, the description of the multiplexing example of the display-enabled area information of FIG. 4 is ended.

The present example is an example in which display-enabled area information is directly encoded and is multiplexed on a bitstream as a supplemental enhancement information message, with respect to pictures from the synchronization starting picture to the synchronization completed picture on a picture-by-picture basis. However, according to the present invention, for example, with respect to a first picture, the display-enabled area information is multiplexed as partial display-enabled area supplemental enhancement information message shown in FIG. 4, and, with respect to subsequent pictures, update information of the display-enabled area may be multiplexed on a bitstream on a picture-by-picture basis as the partial display-enabled area update supplemental enhancement information message shown in FIG. 5.

A multiplexing example of the display-enabled area information in a list of FIG. 5 will be described below.

partial_recovery_ref_poc_cnt indicates that, assuming that the picture number of a picture to which the partial display-enabled area update supplemental enhancement information message is associated is CurrPicOrderCnt, a display-enabled area of the picture is calculated with reference to another display-enabled area defined by the partial display-enabled area supplemental enhancement information message, or the partial display-enabled area update supplemental enhancement information message, associated with a picture defined by a picture number PartRecvRefPicOrderCnt calculated by Formula 3 below.

PartRecvRefPicOrderCnt=CurrPicOrderCnt−partial_recovery_ref_poc_cnt   (Formula 3)

exact_match_flag[i] indicates whether a decoded image in a case where decoding is started from a picture defined by RecoveryStartingPicOrderCnt is exactly matched with a decoded image in a case where a bitstream is received and decoded from the beginning thereof in the display-enabled rectangular area. In a case where a decoded value of exact_match_flag[i] is 1, it is indicated that exact matching of a decoded image is achieved with respect to all pixels in a display-enabled rectangular area. In a case where a decoded value of exact_match_flag[i] is 0, it is indicated that there is a possibility that exact matching of a decoded image will not be achieved with respect to all pixels in a display-enabled rectangular area.

recovery_rect_left_offset_decr[i], recovery_rect_right_offset_decr[i], recovery_rect_top_offset_decr[i], and recovery_rect_bottom_offset_decr[i] are a group of parameters for updating a position on a screen of the display-enabled rectangular area in the picture. Assuming that an upper-left pixel-horizontal coordinate, an upper-left pixel-vertical coordinate, a lower-right pixel-horizontal coordinate, and a lower-right pixel-vertical coordinate in an i-th display-enabled rectangular area, determined in a picture defined by PartRecvRefPicOrderCnt, are RefRecvRectLeft[i], RefRecvRectRight[i], RefRecvRectTop[i], and RefRecvRectBottom[i], values of the upper-left pixel-horizontal coordinate CurrRecvRectLeft[i], the upper-left pixel-vertical coordinate CurrRecvRectRight[i], the lower-right pixel-horizontal coordinate CurrRecvRectTop[i], and the lower-right pixel-vertical coordinate CurrRecvRectBottom[i] in the rectangular area in the picture defined in CurrPicOrderCnt are calculated by Formula 4 below.

CurrRecvRectLeft[i]=RefRecvRectLeft[i]−recovery_rect_left_offset_decr[i]CurrRecvRectRight[i]=RefRecvRectRight[i]+recovery_rect_right_offset_decr[i]CurrRecvRectTop[i]=RefRecvRectTop[i]−recovery_rect_top_offset_decr[i]CurrRecvRectBottom[i]=RefRecvRectBottom[i]+recovery_rect_bottom_offset_decr[i]   (Formula 4)

With respect to recovery_rect_left_offset_decr[i], recovery_rect_right_offset_decr[i], recovery_rect_top_offset_decr[i], and recovery_rect_bottom_offset_decr[i], when each variable does not exist on the bitstream, its value is considered to be 0.

Now, the description of the multiplexing example of the display-enabled area update information of FIG. 5 is ended.

Further, the present example is an example in which display-enabled area information is multiplexed on a bitstream as a supplemental enhancement information message independent of other supplemental enhancement information messages in FIGS. 4 and 5. However, according to the present invention, for example, in the synchronization starting picture, information of partial display-enabled area as illustrated in the list of FIG. 6 may be superposed on the recovery point supplemental enhancement information message illustrated in the list of FIG. 17, and may be multiplexed on a bitstream.

A multiplexing example of the display-enabled area information illustrated in the list of FIG. 6 will be described below.

partital_recovery_info_present_flag is a parameter indicating whether information of the partial display-enabled area exists in a relevant supplemental enhancement information message.

Since other parameters displayed in the list of FIG. 6 are identical to the parameters displayed in the list of FIG. 4 and FIG. 17, a description thereof is omitted herein.

Now, the description of the multiplexing example of the display-enabled area information of FIG. 6 is ended.

Further, in the above description of the video encoding process in the video encoding device of the first exemplary embodiment of the present invention, an operation example of encoding the display-enabled area information and multiplexing the display-enabled area information on a bitstream, for each picture having a display-enabled area, is illustrated. However, according to the present invention, the display-enabled area information in the synchronization starting picture may be superposed on the recovery point supplemental enhancement information message and may be multiplexed on a bitstream until the synchronization completed picture as illustrated in the list of FIG. 7, or the display-enabled area information may be encoded and multiplexed on a bitstream for every several pictures.

A multiplexing example of the display-enabled area information that is illustrated in FIG. 7 will be described below.

partial_recovery_update_info_present_flag[i] is a parameter indicating whether update information of an i-th display-enabled area exists in a picture after the synchronization starting picture.

Since other parameters illustrated in the list of FIG. 7 are identical to parameters displayed in the list of FIG. 6 and FIG. 17, a description thereof is omitted herein.

Now, the description of the multiplexing example of the display-enabled area information of FIG. 7 is ended.

The present example is an example in which the display-enabled area information is multiplexed as a supplemental enhancement information message with respect to each picture. However, according to the present invention, the display-enabled area information may be multiplexed with, for example, a sequence parameter set used for encoding and decoding of a whole bitstream or the display-enabled area information may be multiplexed with, for example, a picture parameter set.

In addition, in the present example, the display-enabled area information is encoded with respect to all pictures from the synchronization starting picture to the synchronization completed picture and is multiplexed on the bitstream. However, the present invention is not limited to encoding of the display-enabled area information for all pictures from the synchronization starting picture to the synchronization completed picture, and the display-enabled area information may be encoded selectively for certain pictures from the synchronization starting picture to the synchronization completed picture and may be multiplexed on a bitstream.

In the present example, refresh is performed by shifting an intra-coded segment from the left to the right in a screen at uniform intervals without overlapping. However, the present invention is not limited to the above refresh, and a refresh direction may be arbitrarily selected. For example, refresh may be performed in an arbitrary direction, such as from right to left, up to down, upper left to lower right, from the center of a picture to left and right, or along an eddy shape from the center of a picture. In addition, the method of shifting an intra-coded segment for refresh is arbitrary. A size of the intra-coded segment may vary with respect to respective pictures and the same area may be set as the intra-coded segment two or more times during a refreshing period. In addition, as known from the description of gradual refresh described herein, the present invention is not limited to refresh based on intra-coded segments, and refresh may be performed using an arbitrary method, such as a method of limiting a prediction range of inter-picture predictive coding.

Although the display-enabled area is encoded as offset values from the upper, lower, left and right edges of a picture and is multiplexed on a bitstream in the present example, the present invention is not limited to the configuration in which the display-enabled area is encoded as offset values from the upper, lower, left and right edges of a picture, and the display-enabled area may be encoded by using an arbitrary expression method.

Although the display-enabled area information is multiplexed according to the describing method of the AVC described in Non Patent Literature 1, the present invention is not limited to use of the AVC, and may be applicable to other video encoding methods or to an arbitrary dimensional video encoding method instead of the two dimensional video.

In the present example, although the display-enabled area is encoded as a set of rectangular areas on a two dimensional image and is multiplexed on a bitstream, the present invention is not limited to the encoding of the display-enabled area as the set of rectangular areas on the two-dimensional image, and the display-enabled area may be encoded by using an arbitrary expression method instead of the set of rectangular areas or may be encoded as an arbitrary dimensional area.

The description of the video encoding device of the first exemplary embodiment of the present invention is ended now.

Second Exemplary Embodiment

FIG. 8 is a block diagram of a video decoding device according to a second exemplary embodiment of the present invention. As illustrated in FIG. 8, the video decoding device of the second exemplary embodiment includes a demultiplexer 201, a video decoder 202, a display-enabled area decoder 203, and a video output controller 204. The present exemplary embodiment is characterized in that the display-enabled area decoder 203 that decodes and outputs information of a display-enabled area in each picture is provided, and the video output controller 204 that interprets the display-enabled area and performs control such that a decoded image other than the display-enabled area is not output is also provided.

The demultiplexer 201 demultiplexes a bitstream, extracts a video bitstream and a display-enabled area information bitstream, and supplies the video bitstream to the video decoder 202, and supplies the display-enabled area information bitstream to the display-enabled area decoder 203.

The video decoder 202 decodes the video bitstream and supplies an obtained reconstructed image to the video output controller 204.

The display-enabled area decoder 203 decodes the display-enabled area information bitstream and supplies obtained display-enabled area information to the video output controller 204.

The video output controller 204 controls such that an image outside the display-enabled area obtained from the display-enabled area decoder 203 is not displayed with respect to the reconstructed image supplied from the video decoder 202, and outputs a processing result as a decoded video.

Figure 9:
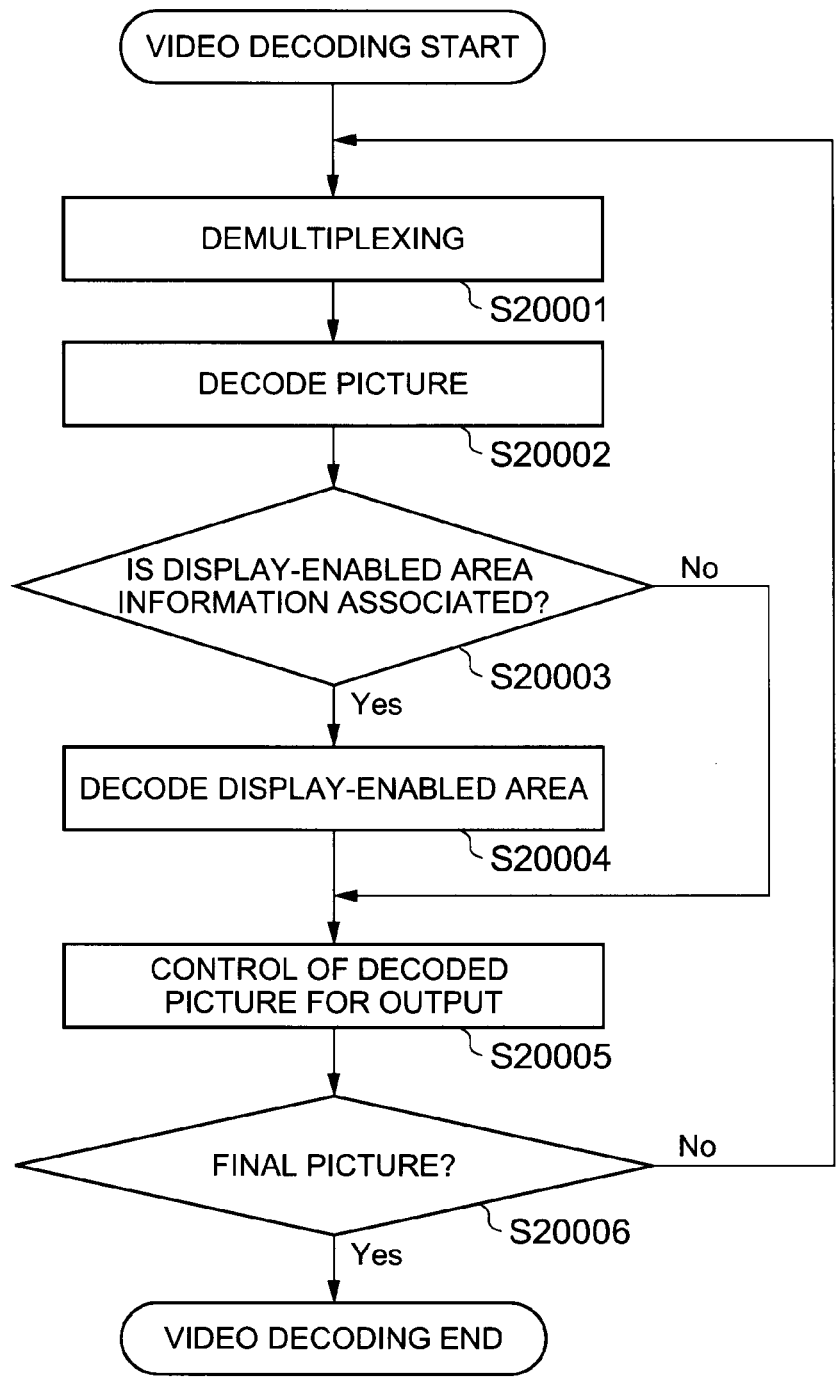
FIG. 9 It depicts a flowchart illustrating an operation example of the video decoding device of the second exemplary embodiment.

A video decoding process by the video decoding device of the second exemplary embodiment will be described below with reference to a flowchart of FIG. 9.

In step S20001, the demultiplexer 201 demultiplexes a bitstream, extracts a video bitstream and a display-enabled area information bitstream, and supplies the video bitstream to the video decoder 202, and the display-enabled area information bitstream to the display-enabled area decoder 203.

In step S20002, the video decoder 202 decodes the video bitstream and supplies an obtained reconstructed image to the video output controller 204.

In step S20003, when display-enabled area information is associated with a picture, the process proceeds to step S20004. When display-enabled area information is not associated with the picture, processing of step S20004 is skipped and the process proceeds to step S20005.

In step S20004, the display-enabled area decoder 203 decodes the display-enabled area information bitstream and supplies obtained display-enabled area information to the video output controller 204.

In step S20005, the video output controller 204 controls such that an image outside the display-enabled area obtained from the display-enabled area decoder 203 is not displayed with respect to the reconstructed image supplied from the video decoder 202, and outputs a processing result as a decoded video.

In step S20006, when the bitstream decoded in step S20002 corresponds to a final picture to be decoded, video decoding is ended. In a case where the bitstream does not correspond to the final picture, the process returns to S20001.

According to the above configuration, when receiving and replaying a bitstream generated by using gradual refresh in the middle thereof, the video decoding device starts display partially without obtaining a display-enabled area from a prediction reference range by calculation, rather than waits for decoding of a synchronization completed picture, thereby reducing display delay. This is because the video output controller 204 can control such that an image outside the display-enabled area is not output as a decoded video since the video the decoding device receives information defining a display-enabled area as a bitstream from the video encoding device, and the demultiplexer 201 supplies the information to the display-enabled area decoder 203.

Now, the description of the video decoding device of the second exemplary embodiment of the present invention is ended.

Third Exemplary Embodiment

Figure 10:
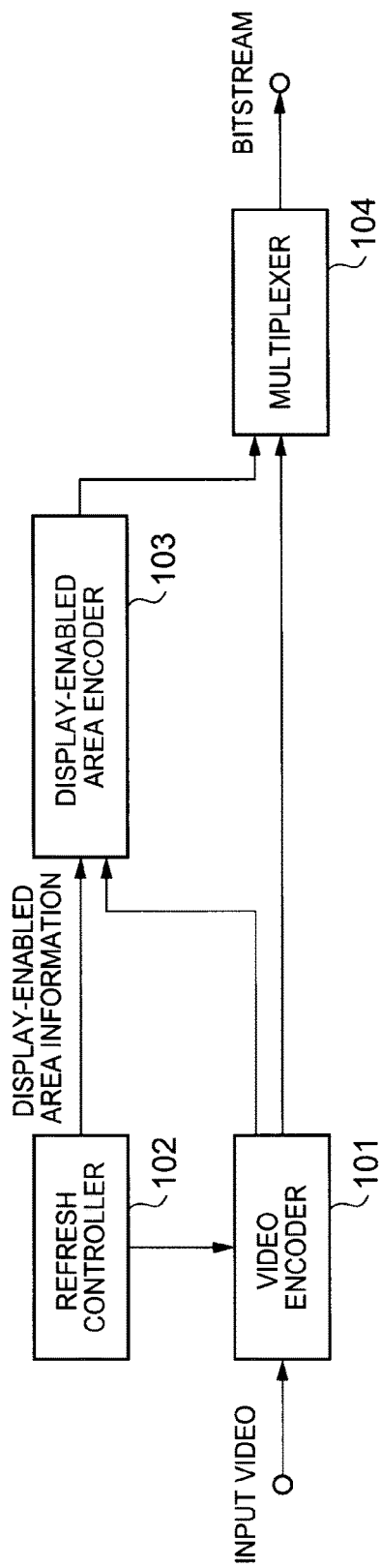
FIG. 10 It depicts a block diagram illustrating a configuration example of a video encoding device of a third exemplary embodiment according to the present invention.

FIG. 10 is a block diagram of a video encoding device according to a third exemplary embodiment of the present invention. As illustrated in FIG. 10, the video encoding device of the third exemplary embodiment is similar in that the same components is included, but is different in that a control signal is supplied to the display-enabled area encoder 103, rather than the video encoder 101, as compared with the video encoding device of the first exemplary embodiment illustrated in FIG. 1. Since operations of the refresh controller 102 and the multiplexer 104 among the components of the video encoding device of the third exemplary embodiment are identical to operations of those of the video encoding device of the first exemplary embodiment, a description will be given for remaining blocks below.

The video encoder 101 performs encoding on each of pictures constituting an input video and provides a bitstream of the video to the multiplexer 104. In addition, information related to an area in which refresh is completed is supplied to the display-enabled area encoder 103.

The display-enabled area encoder 103 calculates and encodes display-enabled area information based on display-enabled area information supplied from the refresh controller 102 and refresh completed area information supplied from the video encoder 101, and supplies the display-enabled area information to the multiplexer 104 as a display-enabled area information bitstream.

A video encoding process by the video encoding device of the third exemplary embodiment is represented by the flowchart of FIG. 2 like the video encoding process by the video encoding device of the first exemplary embodiment. In this case, a description for a flow of the video encoding process by the video encoding device of the third exemplary embodiment will be omitted.

According to the above configuration, an effect is obtained in which a display-enabled area wider than that of the video encoding device of the first exemplary embodiment can be transferred to a video decoding device. This is because in a case where intra coding is eventually selected independently of a control signal supplied from the refresh controller 102 and thereby a display-enabled area is generated by completing refresh in the video encoder 101, the display-enabled area encoder 103 can encode a wider display-enabled area and supply the display-enabled area to the multiplexer 104.

Now, the description of the video encoding device of the third exemplary embodiment of the present invention is ended.

Fourth Exemplary Embodiment

Figure 11:
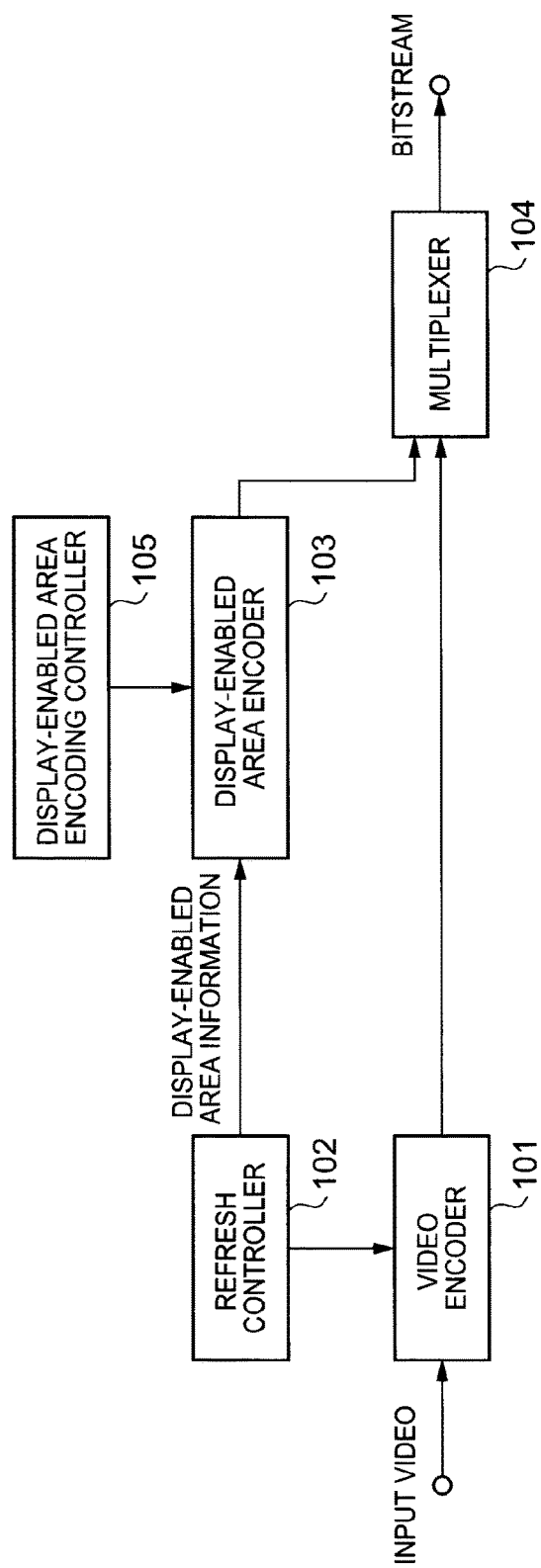
FIG. 11 It depicts a block diagram illustrating a configuration example of a video encoding device of a fourth exemplary embodiment according to the present invention.

FIG. 11 is a block diagram of a video encoding device according to a fourth exemplary embodiment of the present invention. As illustrated in FIG. 11, the video encoding device of the fourth exemplary embodiment is different in that a display-enabled area encoding controller 105 is newly included as a component thereof, as compared with the video encoding device of the first exemplary embodiment illustrated in FIG. 1. Since operations of the video encoder 101, the refresh controller 102 and the multiplexer 104 among the components of the video encoding device of the fourth exemplary embodiment are identical to operations of those of the video encoding device of the first exemplary embodiment, a description will be given for remaining blocks below.

The display-enabled area encoding controller 105 supplies a control signal for controlling encoding of display-enabled area information to the display-enabled area encoder 103.

The display-enabled area encoder 103 encodes information, of which the encoding is indicated by the control signal supplied from the display-enabled area encoding controller 105, among display-enabled area information supplied from the refresh controller 102 and supplies the information to the multiplexer 104 as a display-enabled area information bitstream.

Figure 12:
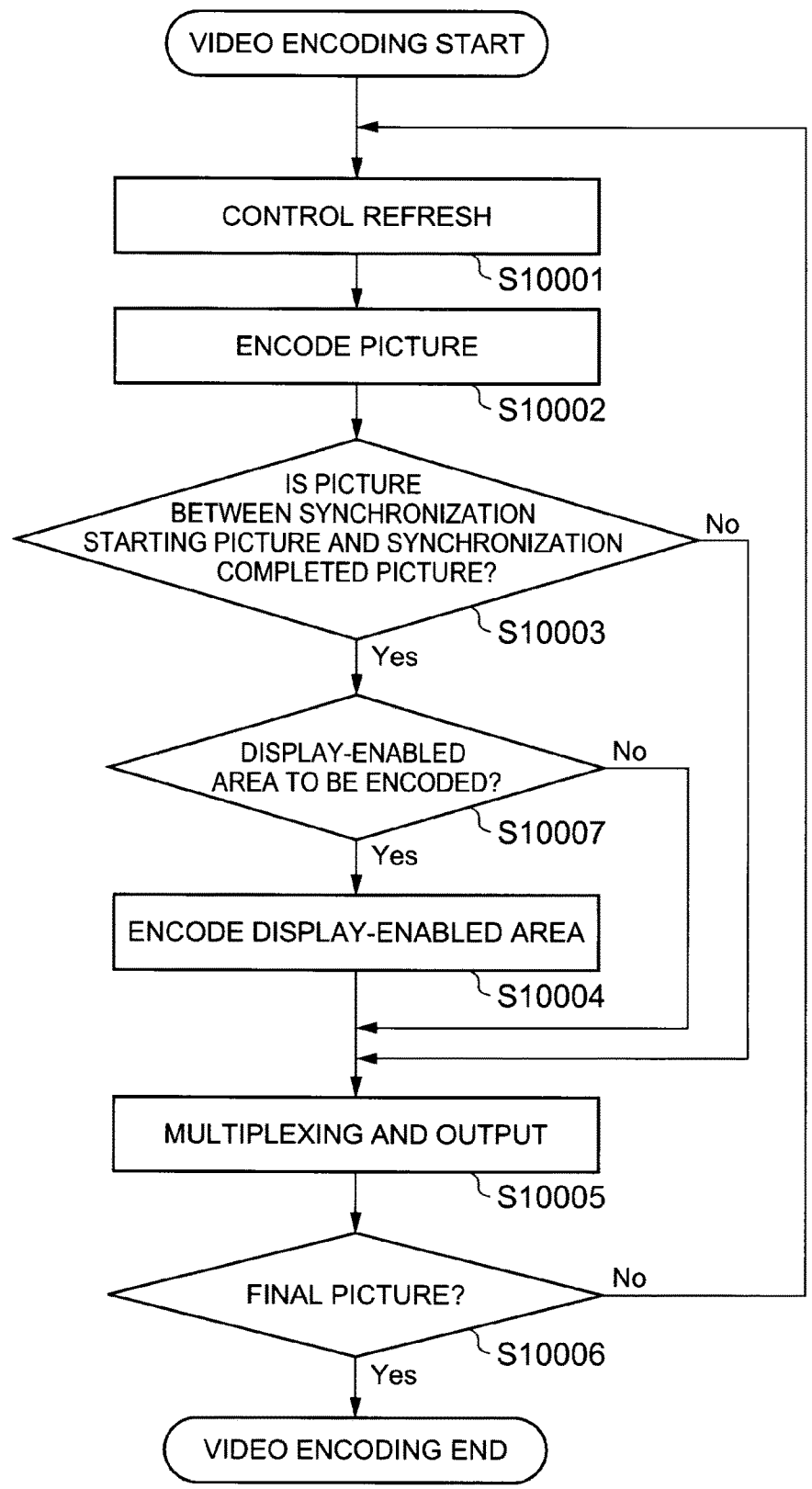
FIG. 12 It depicts a flowchart illustrating an operation example of the video encoding device of the fourth exemplary embodiment.

A video encoding process by the video encoding device of the fourth exemplary embodiment will be described below with reference to a flowchart of FIG. 12.

In step S10001, the refresh controller 102 provides control information defining a refresh operation to the video encoder 101 and the display-enabled area encoder 103.

In step S10002, the video encoder 101 encodes respective pictures of an input video and provides a video bitstream thereof to the multiplexer 104.

In step S10003, in a case where a picture to be currently encoded is a picture between a synchronization starting picture and a synchronization completed picture, the process proceeds to step S10007. In the case where a picture to be currently encoded is not a picture from the synchronization starting picture to the synchronization completed picture, processing of step S10007 and step S10004 is skipped and the process proceeds to step S10005.

In step S10007, when a current display-enabled area is an area to be encoded, the process proceeds to step S10004. Otherwise, processing of step S10004 is skipped and the process proceeds to step S10005.

In step S10004, the display-enabled area encoder 103 encodes information defining a display-enabled area of each picture, and outputs a bitstream thereof to the multiplexer 104.

In step S10005, the multiplexer 104 multiplexes a video bitstream supplied from the video encoder 101 and a display-enabled area information bitstream supplied from the display-enabled area encoder 103 and outputs the multiplexed bitstream as a bitstream.

In step S10006, when the bitstream output in step S10005 corresponds to a final picture to be encoded, video encoding is ended. In a case where the bitstream does not correspond to the final picture, the process returns to S10001.

According to the above configuration, such effect is obtained that a reduction in compression efficiency of the video data can be relatively suppressed when the video encoding device notifies the video decoding device of a partial area where display can be started before the synchronization completed picture, in addition to the effect obtained by the video encoding device of the first exemplary embodiment. This is because a data amount required to transfer the display-enabled area information can be reduced since the display-enabled area encoding controller 105 limits the display-enabled area to be encoded.

Now, the description of the video encoding device of the fourth exemplary embodiment of the present invention is ended.

As it is obvious from the description of the exemplary embodiments of the present invention, the present invention may be realized by hardware, or a computer program.

Figure 13:
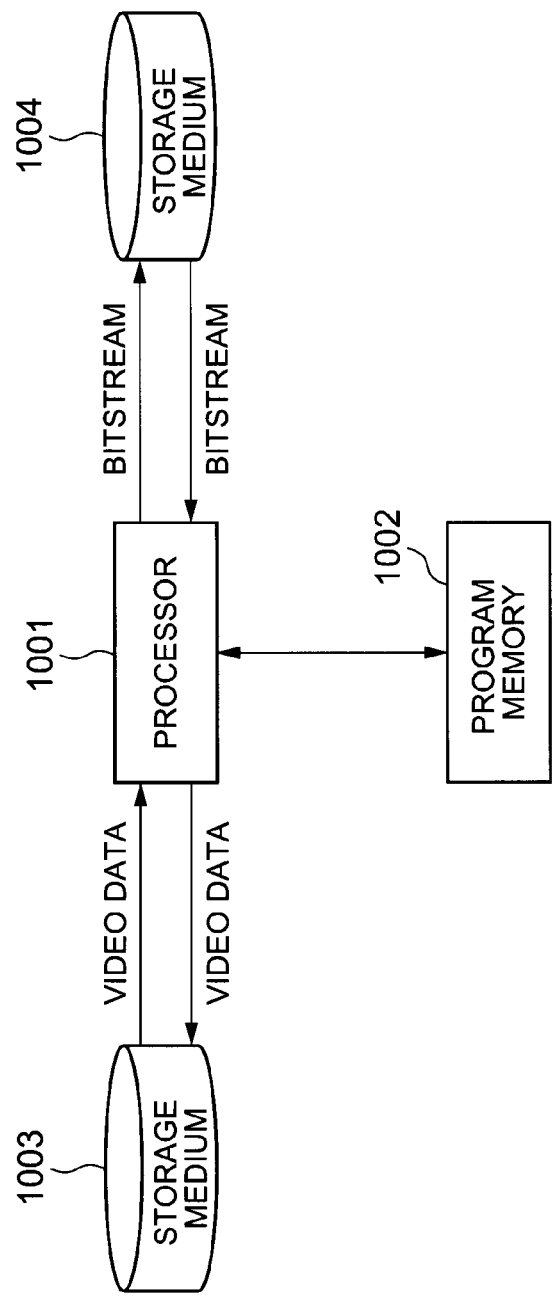
FIG. 13 It depicts a block diagram illustrating an example of an information processing system using a program according to the present invention.
Figure 14:
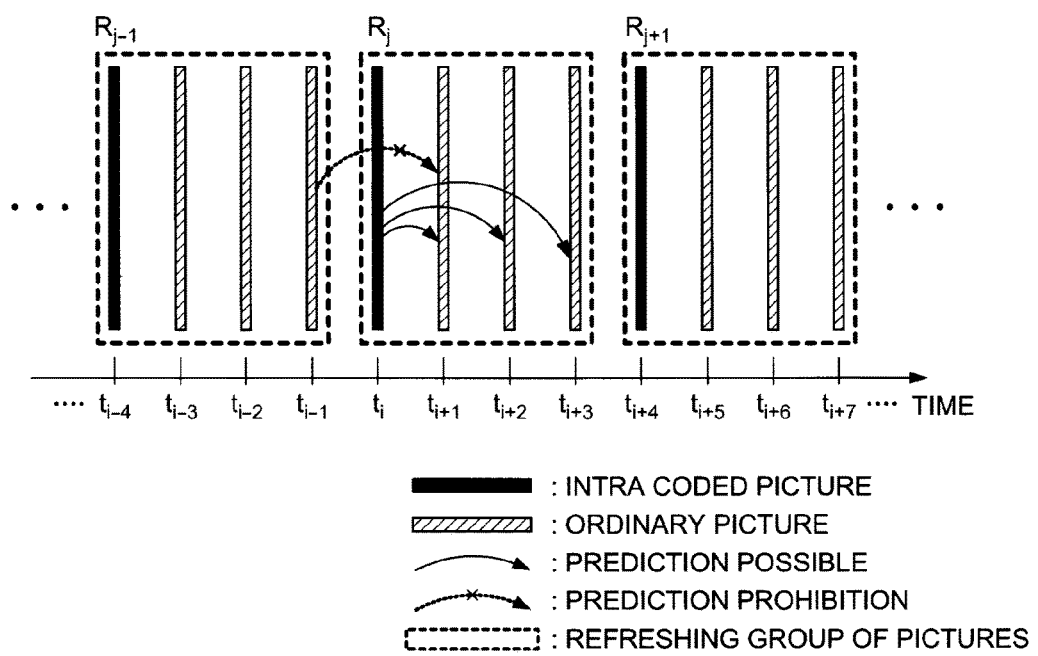
FIG. 14 It depicts an explanatory diagram illustrating an operation example of instantaneous refresh.
Figure 15:
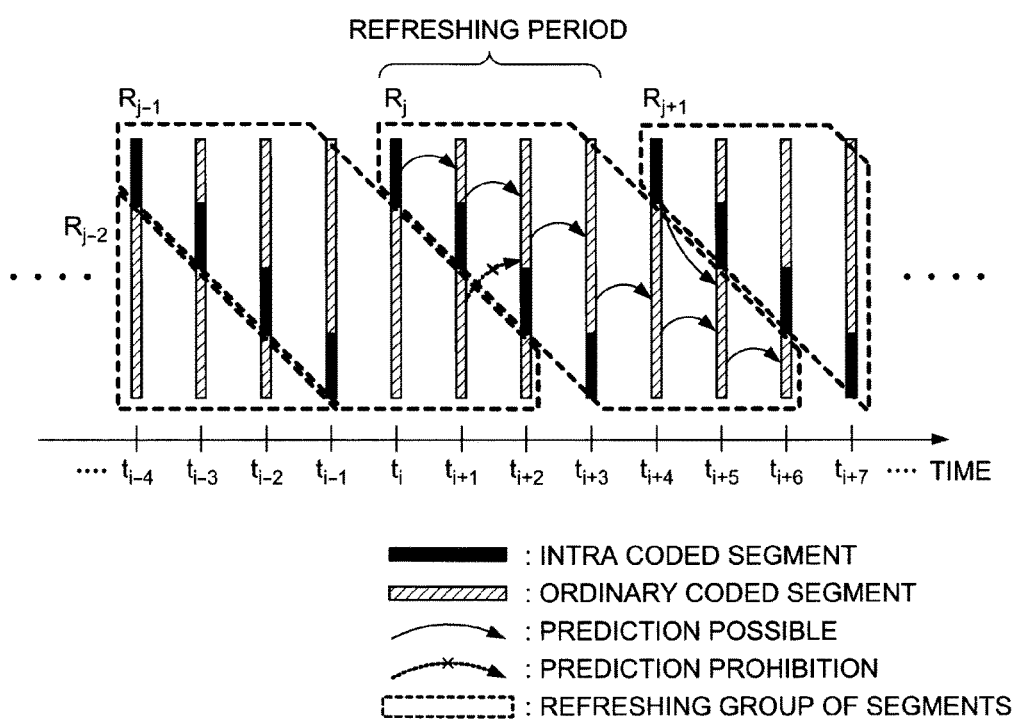
FIG. 15 It depicts an explanatory diagram illustrating an operation example of intra-slice refresh.
Figure 16:
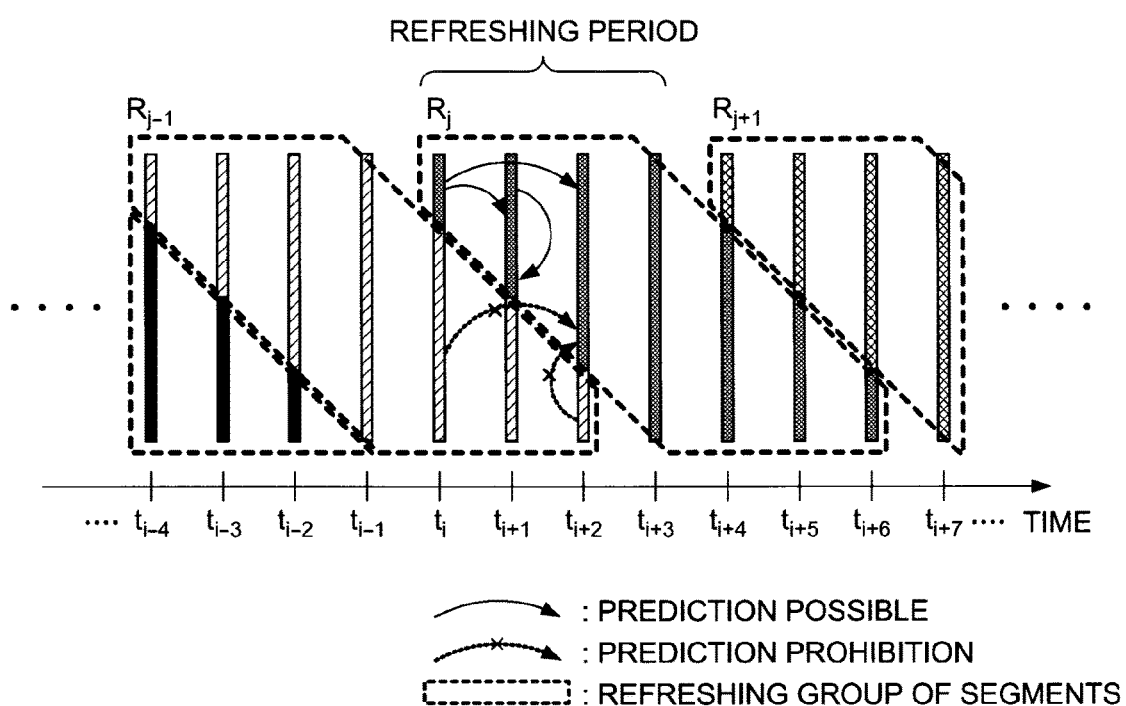
FIG. 16 It depicts an explanatory diagram illustrating an example of generalized gradual refresh.

An information processing system illustrated in FIG. 13 includes a processor 1001, a program memory 1002, and storage mediums 1003 and 1004. The storage medium 1003 and the storage medium 1004 may be separate storage media, or storage areas included in the same storage medium. As the storage medium, a magnetic storage medium such as a hard disk can be used as the storage medium.

In the information processing system illustrated in FIG. 13, the program memory 1002 stores programs for implementing the functions of the respective blocks illustrated in FIG. 1, FIG. 8, FIG. 10, and FIG. 11. The processor 1001 performs processes according to the program stored in the program memory 1002 to implement the functions of the video encoding device or the video decoding device illustrated in FIG. 1, FIG. 8, FIG. 10, and FIG. 11.

Part or all of the aforementioned exemplary embodiments can be described as Supplementary notes mentioned below, but the structure of the present invention is not limited to the following structures.

Supplementary Note 1

A video encoding device comprising: video encoding means for encoding image data of an input moving image based on prediction and generating a video bitstream of encoded pictures; refresh control means for refreshing such that a partial area in the picture is assumed as a unit area to be refreshed and the unit area to be refreshed is moved on a picture-by-picture basis; display-enabled area encoding means for encoding a display-enabled area for each picture in refreshing and generating a display-enabled area information bitstream; and multiplexing means for multiplexing a video bitstream and the display-enabled area information bitstream.

Supplementary Note 2

The video encoding device according to Supplementary note 1, wherein the display-enabled area encoding means generates the display-enabled area information bitstream by using a difference between a display-enabled area in a picture to be encoded and a display-enabled area in a picture encoded in the past.

Supplementary Note 3

The video encoding device according to Supplementary note 1 or 2, further comprising display-enabled area encoding control means for controlling whether to encode the display-enabled area, wherein the display-enabled area encoding means selects and encodes a display-enabled area which is determined to be encoded by the display-enabled area encoding control means.

Supplementary Note 4

The video encoding device according to any one of Supplementary notes 1 to 3, wherein the refresh control means performs refresh by intra coding.

Supplementary Note 5

The video encoding device according to any one of Supplementary notes 1 to 4, wherein the refresh control means shifts a unit area to be refreshed within a prediction limitation range configured by a plurality of pictures, and the video encoding means excludes a predicted value by intra-picture prediction or inter-picture prediction which is beyond the prediction limitation range when performing encoding based on prediction.

Supplementary Note 6

A video decoding device comprising: demultiplexing means for demultiplexing a bitstream including video data and a bitstream including display-enabled area information in an image to be decoded; video decoding means for decoding the demultiplexed video bitstream based on prediction and generating image data; video output control means for limiting an output area of the image data based on the demultiplexed display-enabled area information; and display-enabled area decoding means for decoding the demultiplexed display-enabled area information bitstream according to a predetermined method and extracting at least a part of the display-enabled area information.

Supplementary Note 7

The video decoding device according to Supplementary note 6, wherein the display-enabled area information bitstream includes at least a difference between a display-enabled area in a picture to be decoded and a display-enabled area in a picture decoded in the past, and the display-enabled area decoding means extracts the difference between the display-enabled area in the picture to be decoded and the display-enabled area in the picture decoded in the past from the display-enabled area information bitstream and obtains a display-enabled area in the picture to be decoded.

Supplementary Note 8

A video encoding method comprising: encoding image data of an input moving image based on prediction and generating a video bitstream of encoded pictures; refreshing such that a partial area in the picture is assumed as a unit area to be refreshed and the unit area to be refreshed is moved on a picture-by-picture basis; encoding a display-enabled area for each picture and generating a display-enabled area information bitstream in refreshing; and multiplexing the video bitstream and the display-enabled area information bitstream.

Supplementary Note 9

The video encoding method according to Supplementary note 8, further comprising generating the display-enabled area information bitstream by using a difference between a display-enabled area in a picture to be encoded and a display-enabled area in a picture encoded in the past.

Supplementary Note 10

The video encoding method according to Supplementary note 8 or 9, further comprising controlling whether to encode the display-enabled area, and selecting and encoding a display-enabled area which is determined to be encoded by the control.

Supplementary Note 11

The video encoding method according to any one of Supplementary notes 8 to 10 further comprising refreshing by intra coding when picture refresh is performed.

Supplementary Note 12

The video encoding method according to any one of Supplementary notes 8 to 11, wherein, when picture refresh is performed, shifting a unit area to be refreshed within a prediction limitation range configured by a plurality of pictures, and excluding a predicted value by intra-picture prediction or inter-picture prediction which is out of the prediction limitation range when performing encoding based on prediction.

Supplementary Note 13

A video decoding method comprising: demultiplexing a bitstream including video data and a bitstream including display-enabled area information in an image to be decoded; decoding the demultiplexed video bitstream based on prediction and generating image data; limiting an output area of the image data based on the demultiplexed display-enabled area information; and decoding the demultiplexed display-enabled area information bitstream according to a predetermined method and extracting at least a part of the display-enabled area information.

Supplementary Note 14

The video decoding device according to Supplementary note 13, further comprising extracting a difference between a display-enabled area in a picture to be decoded and a display-enabled area in a picture decoded in the past from the display-enabled area information bitstream including at least the difference between the display-enabled area in the picture to be decoded and the display-enabled area in the picture decoded in the past and obtaining a display-enabled area in the picture to be decoded.

Supplementary Note 15

A video encoding program which causes a computer to perform: a video encoding process of encoding image data of an input moving image based on prediction and generating a video bitstream of encoded pictures; a refresh control process of refreshing such that a partial area in the picture is assumed as a unit area to be refreshed and the unit area to be refreshed is moved on a picture-by-picture basis; a display-enabled area encoding process of encoding a display-enabled area for each picture and generating a display-enabled area information bitstream in refreshing; and a multiplexing process of multiplexing a video bitstream and the display-enabled area information bitstream.

Supplementary Note 16

The video encoding program according to Supplementary note 15, wherein in the display-enabled area encoding process, the computer is caused to perform generating the display-enabled area information bitstream by using a difference between a display-enabled area in a picture to be encoded and a display-enabled area in a picture encoded in the past.

Supplementary Note 17

The video encoding program according to Supplementary note 15 or 16, wherein the computer is caused to perform the display-enabled area encoding control process of controlling whether to encode the display-enabled area, and in the display-enabled area encoding process, to perform selecting and encoding a display-enabled area which is determined to be encoded in the display-enabled area encoding control process.

Supplementary Note 18

The video encoding program according to any one of Supplementary note 15 to 17, wherein in the refresh control process, the computer is caused to perform refresh by intra coding.

Supplementary Note 19

The video encoding program according to any one of Supplementary note 15 to 18, wherein in the refresh control process, the computer is caused to perform shifting a unit area to be refreshed within a prediction limitation range configured by a plurality of pictures, and in the video encoding process, to perform excluding a predicted value by intra-picture prediction or inter-picture prediction which is out of the prediction limitation range when encoding is performed based on prediction.

Supplementary Note 20

A video decoding program which causes a computer to perform: a demultiplexing process of demultiplexing a bitstream including video data and a bitstream including display-enabled area information in an image to be decoded; a video decoding process of decoding the demultiplexed video bitstream based on prediction and generating image data; a video output control process of limiting an output area of the image data based on the demultiplexed display-enabled area information; and a display-enabled area decoding process of decoding the demultiplexed display-enabled area information bitstream according to a predetermined method and extracting at least a part of the display-enabled area information.

Supplementary Note 21

The video decoding program according to Supplementary note 20, wherein in the display-enabled area decoding process, the computer is caused to perform extracting a difference between a display-enabled area in a picture to be decoded and a display-enabled area in a picture decoded in the past from the display-enabled area information bitstream including at least the difference between the display-enabled area in the picture to be decoded in display-enabled area and the display-enabled area in the picture decoded in the past, and obtaining a display-enabled area in the picture to be decoded.

While the present invention has been described with reference to the exemplary embodiments and examples, the present invention is not limited to the aforementioned exemplary embodiments and examples. Various changes understandable to those skilled in the art within the scope of the present invention can be made to the structures and details of the present invention.

This application claims priority based on Japanese Patent Application No. 2012-141924 filed on Jun. 25, 2012, the disclosures of which are incorporated herein in their entirety.

REFERENCE SIGNS LIST

101 Video encoder
102 Refresh controller
103 Display-enabled area encoder
104 Multiplexer
105 Display-enabled area encoding controller
201 Demultiplexer
202 Video decoder
203 Display-enabled area decoder
204 Video output controller

The invention claimed is:

1. A video decoding device comprising:
a demultiplexer which demultiplexes a video bitstream including image data of encoded segments of a picture and Supplemental-Enhancement-Information, wherein the Supplemental-Enhancement-Information has:
    display-enabled-area information which indicates segments, of the encoded segments, where a refresh has completed in the picture, and
    information indicating a refreshing group of segments, of the encoded segments, in gradual refresh;
a detector which detects whether the encoded segments are associated with the display-enabled area information;
an extractor which extracts the display-enabled-area information from the demultiplexed Supplemental-Enhancement-Information when at least one of the encoded segments is detected to be associated with the display-enabled area information; and
a video decoder which decodes the image data from the demultiplexed video bitstream based on prediction.

2. A video decoding method comprising:
demultiplexing a video bitstream including image data of encoded segments of a picture and Supplemental-Enhancement-Information having, wherein the Supplemental-Enhancement-Information has:
    display-enabled-area information which indicates segments, of the encoded segments, where a refresh has completed in the picture, and
    information indicating a refreshing group of segments, of the encoded segments, in gradual refresh;
whether the encoded segments are associated with the display-enabled area information;
extracting the display-enabled-area information from the demultiplexed Supplemental-Enhancement-Information when at least one of the encoded segments is detected to be associated with the display-enabled area information; and
decoding the image data from the demultiplexed video bitstream based on prediction.

* * * * *